C. COESTER, Jr.

TOY CAP EXPLODER.

No. 7,008. Reissued March 21, 1876.

WITNESSES

Henry N. Miller

Franck L. Durand

INVENTOR

C. Coester, Jr.

By Alexander Hweson

Attorneys

N. PETERS, PHOTO-LITHOGRAPHER, WASHINGTON, D. C.

UNITED STATES PATENT OFFICE.

CHARLES COESTER, JR., OF BRIDGEPORT, CONNECTICUT.

IMPROVEMENT IN TOY CAP-EXPLODERS.

Specification forming part of Letters Patent No. 173,212, dated February 8, 1876; reissue No 7,008, dated March 21, 1876; application filed March 8, 1876.

*To all whom it may concern:*

Be it known that I, CHARLES COESTER, Jr., of Bridgeport, in the county of Fairfield and State of Connecticut, have invented certain new and useful Improvements in Toy Cap-Exploder; and I do hereby declare that the following is a full, clear, and exact description thereof, reference being had to the accompanying drawings, and to the letters of reference marked thereon, which form a part of this specification.

My invention consists of two pieces of metal or other suitable material, so constructed and arranged that on being projected from the hand, they may be caused to strike an object or surface, or jar together suddenly, and explode a fulminating powder or cap placed between them, as hereinafter more fully set forth.

The pieces may be made of any suitable shape, and of a size to be handled easily to amuse and interest children.

The parts may be held together or adjacent to each other by any suitable means—for instance, one part may be hinged to the other. The two parts may be connected by a rod, wire, or a string, or in any manner known to mechanics, so that a small space may be had between the two for the insertion of the fulminating powder or cap.

The two parts are preferably made of metal; but I do not wish to confine myself to such, as any other material or materials may be used with equal success for the object designed.

The said pieces may be plain on the faces between which the fulminate is placed, and have a spring to press them gently together for retaining the fulminate; or one may have a groove or socket in which to press the fulminate, and the other a projection for exploding it, and a nipple or nipples may be used in one piece for firing metallic caps.

Similar letters of reference indicate corresponding parts.

Figure 1:
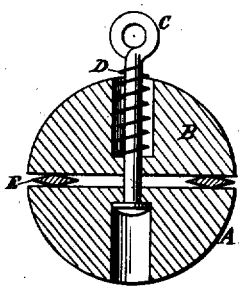
Figure 3:
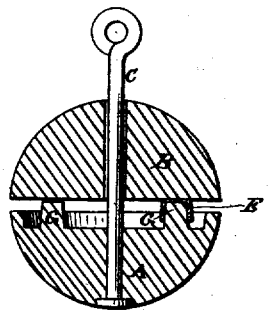
Figure 2:
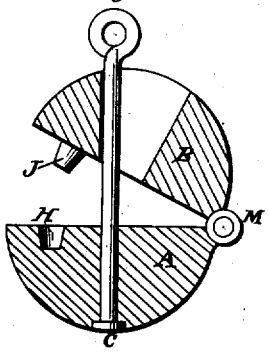
Figure 4:
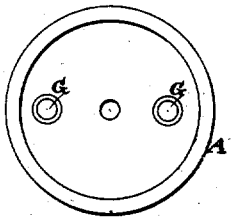
Figure 5:
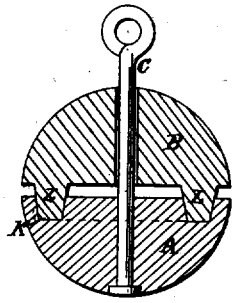

Figure 1 is a sectional elevation of the toy constructed with plain faces, and a spring for retaining the fulminate. Fig. 2 is a section showing a cavity in one piece, and a projection on the other, and the pieces hinged together. Fig. 3 is a section showing the arrangement of nipples for exploding metallic caps. Fig. 4 is a top view of the nipple-piece of Fig. 3; and Fig. 5 is a section showing the arrangement of an annular groove in which to press paper caps and the like, so as to be retained during the flight of the projectile.

In the drawings the parts are shown to be each in semi-globular form A and B, and having flat faces adjacent to each other. C represents a rod, which is passed through a central orifice in each, and to which a cord may be attached.

Instead of this rod, the cord may be passed directly through the parts, and connected by a knot or otherwise at the bottom of the lower piece A, so that the upper piece B may slide or swing on said rod or cord, to open slightly and receive the fulminating powder E or cap F.

G represents nipples for metallic caps F. H is a cavity for pressing in paper caps. J is a projection for exploding the caps in said cavity, and K a grooved cavity; L, a corresponding projection for the same. M is a pivot joint or hinge for connecting the parts, in case it may be preferred to arrange them that way.

The operation of this toy is very simple. The parts A and B are slightly separated, and between them is either inserted the fulminating powder-cap E, or the common gun-cap F. A sudden jar or jerk, either by dropping the bottom piece A against an object or surface, or (when connected by a cord) by throwing the toy out in the air and retaining hold of the cord, will cause the parts to suddenly come together and explode the powder or cap between them.

Having thus fully described my invention, what I claim as new, and desire to secure by Letters Patent, is—

1. A toy consisting of two pieces of metal or other solid material, loosely connected and arranged adjacent to each other in such a manner that by being dropped or forced into contact with an object or surface, or having their motion suddenly arrested, a fulminating powder or cap, previously placed between the parts, will be caused to explode, substantially as set forth.

2. The combination of the two pieces A and B, of equal parts of metal or other material, having plain surfaces or edges arranged face to face, each having a central orifice and connected by a rod or cord, substantially as and for the purposes set forth.

3. The pieces A B, in combination with the rod C and spring D, arranged at right angles to the plane of division, substantially as described, for the purpose set forth.

4. The pieces A B, of equal parts, hinged together at M, and centrally connected by a cord or rod, as set forth.

5. The solid pieces A B, of equal parts, centrally connected and hinged together, and provided with a nipple and corresponding groove or depression, substantially as herein set forth.

6. The metal or other pieces A B, hinged at M, connected by the rod C, and provided with a nipple and corresponding groove or depression, substantially as described.

In testimony that I claim the foregoing I have hereunto set my hand this 6th day of March, 1876.

CHAS. COESTER, JR.

Witnesses:
GEO. A. STAPLES,
ISAAC C. FOWLER.